US011618371B1

(12) United States Patent
Kim et al.

(10) Patent No.: US 11,618,371 B1
(45) Date of Patent: Apr. 4, 2023

(54) PUDDLE LAMP FOR VEHICLE

(71) Applicant: SL Mirrortech Corporation, Siheung-si (KR)

(72) Inventors: Seoyoung Kim, Siheung-si (KR); Wonbin Kim, Siheung-si (KR); Min Gi Jung, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 0 days.

(21) Appl. No.: 17/966,655

(22) Filed: Oct. 14, 2022

(30) Foreign Application Priority Data

Oct. 22, 2021 (KR) ........................ 10-2021-0141799

(51) Int. Cl.
B60Q 1/24 (2006.01)
F21V 5/04 (2006.01)
F21W 102/40 (2018.01)

(52) U.S. Cl.
CPC ................ *B60Q 1/247* (2022.05); *F21V 5/04* (2013.01); *F21W 2102/40* (2018.01)

(58) Field of Classification Search
CPC .......................... B60Q 1/24–249; F21V 5/04; F21W 2102/40; F21W 2104/00
See application file for complete search history.

(56) References Cited

U.S. PATENT DOCUMENTS 9,321,395 B2 * 4/2016 Ammar ................ G03B 21/206

* cited by examiner

*Primary Examiner* — Jason M Han
(74) *Attorney, Agent, or Firm* — United One Law Group LLC; Kongsik Kim; Jhongwoo Peck

(57) ABSTRACT

A puddle lamp for a vehicle includes a light source unit including a plurality of light sources installed on a substrate to allow formation of a plurality of images on ground; a light condensing unit including a plurality of condensing lenses for condensing light generated from the plurality of light sources; an imaging unit for transmitting the light from the light condensing unit to form at least one of the plurality of images; and a holder disposed between the light source unit and the light condensing unit to fix positions of the light source unit and the light condensing unit. The holder includes a partition wall unit to allow the light generated from each of the plurality of light sources to be separated from one another and to proceed to the imaging unit.

13 Claims, 15 Drawing Sheets

FIG. 12

| LIGHT SOURCE UNIT | | IMAGE |
|---|---|---|
| FIRST LIGHT SOURCE | SECOND LIGHT SOURCE | |
| ON | OFF | I1 |
| OFF | ON | I2 |
| ON | ON | I2, I1 |

PUDDLE LAMP FOR VEHICLE

CROSS-REFERENCE TO RELATED APPLICATION

This application claims priority from Korean Patent Application No. 10-2021-0141799, filed on Oct. 22, 2021, which is incorporated herein by reference in its entirety.

BACKGROUND

1. Technical Field

The present disclosure relates to a puddle lamp for a vehicle, and more particularly, to a puddle lamp for a vehicle that forms an image of a predetermined shape by irradiating light to the ground around the vehicle.

2. Description of the Related Art

In general, a vehicle is provided with various types of lamps having an illumination function for easily identifying an object located around the vehicle during low-light conditions (e.g., night-time driving) and a signaling function for notifying other vehicles or road users of the driving state of the vehicle.

For example, a head lamp and a fog lamp are primarily for the purpose of the illumination function, and a turn signal lamp, a tail lamp, a brake lamp, and a side marker are for the purpose of the signaling function. The installation standards and specifications for these lamps are stipulated by laws and regulations to ensure that each functional requirement is fully met.

Recently, a puddle lamp is provided in the side mirror of a vehicle to secure a field of view when a driver or passenger embarks or disembarks in a dark environment or to form an image capable of expressing a vehicle's unique personality on the ground around the vehicle.

Since such a puddle lamp is installed in a narrow space, such as a side mirror of a vehicle, a method for enabling the formation of various images while securing an installation space by reducing components constituting the puddle lamp is required.

SUMMARY

The present disclosure was devised to solve the above problems, and the technical object of the present disclosure is to provide a puddle lamp for a vehicle capable of sharing the components for forming a plurality of different images, thereby reducing the number of parts and simplifying the assembly process.

The objects of the present disclosure are not limited to those mentioned above, and other objects not mentioned will be clearly understood by those skilled in the art from the following description.

According to an aspect of the present disclosure, a puddle lamp for vehicle may include a light source unit including a plurality of light sources installed on a substrate to allow formation of a plurality of images on ground; a light condensing unit including a plurality of condensing lenses for condensing light generated from the plurality of light sources; an imaging unit for transmitting the light from the light condensing unit to form at least one of the plurality of images; and a holder disposed between the light source unit and the light condensing unit to fix positions of the light source unit and the light condensing unit. The holder may include a partition wall unit to allow the light generated from each of the plurality of light sources to be separated from one another and to proceed to the imaging unit.

The plurality of condensing lenses may have an incident surface integrally formed therewith.

The holder may include a plurality of guide apertures for guiding the light generated from each of the plurality of light sources to each of the plurality of condensing lenses, and the plurality of guide apertures may be partitioned by the partition wall unit.

The partition wall unit may include a distal end that passes through a through hole formed in the light condensing unit to be in contact with the imaging unit, and a proximal end disposed between the plurality of light sources to be in contact with the substrate. The through hole may be disposed between the plurality of condensing lenses.

The imaging unit may include a plurality of incident lenses; a plurality of emitting lenses, each corresponding to each of the plurality of incident lenses; and a plurality of shields for obstructing at least a portion of light from proceeding to the plurality of emitting lenses. Each of the plurality of shields may include a transmission region through which light is transmitted; and a blocking region that obstructs light. Accordingly, a shape of the image may be defined by a shape of the transmission region. The imaging unit may include a plurality of regions, each corresponding to each of the plurality of light sources, and a shield belonging to at least one of the plurality of regions among the plurality of shields may have the transmission region having a different shape from a shield belonging to at least one other of the plurality of regions among the plurality of shields. No shield may be formed in a region that faces the partition wall unit.

The imaging unit may further include an optical member, in which the plurality of incident lenses are disposed on an incident surface thereof and the plurality of emitting lenses are disposed on an emitting surface thereof. The plurality of shields may be formed on any one of the incident surface or the emitting surface of the optical member.

A housing may be further provided, such that the light source unit, the light condensing unit, the imaging unit, and the holder may be accommodated therein. At least a portion of an inner surface of the housing may be surface-treated to allow light to be diffusely reflected. The housing may include an opening, through which the light that passes through the imaging unit is irradiated, and at an end of the opening proximate to the imaging unit, a step portion may be formed to allow an edge of the imaging unit to be seated.

Further, at least one of the plurality of light sources may be spaced apart by a predetermined offset in at least one direction with respect to an optical axis of a corresponding condensing lens of the plurality of condensing lenses.

According to the puddle lamp for a vehicle of the present disclosure as described above, there are one or more of the following effects. Since a plurality of different images can be formed by the light generated from each of the plurality of light sources, more diverse images can be formed. In addition, the components can be commonly used for forming an image with light generated from a plurality of light sources, thereby simplifying the configuration and improving assembly characteristics. In addition, since the light generated from the plurality of light sources proceeds while being separated from one another by the partition wall unit, interference between the light generated from each of the plurality of light sources can be prevented or minimized.

The effects of the present disclosure are not limited to the above-mentioned ones, and other effects not mentioned will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which:

FIG. 12 is a schematic view showing an image formed by a vehicle puddle lamp according to an embodiment of the present disclosure;

DETAILED DESCRIPTION

Figure 1:
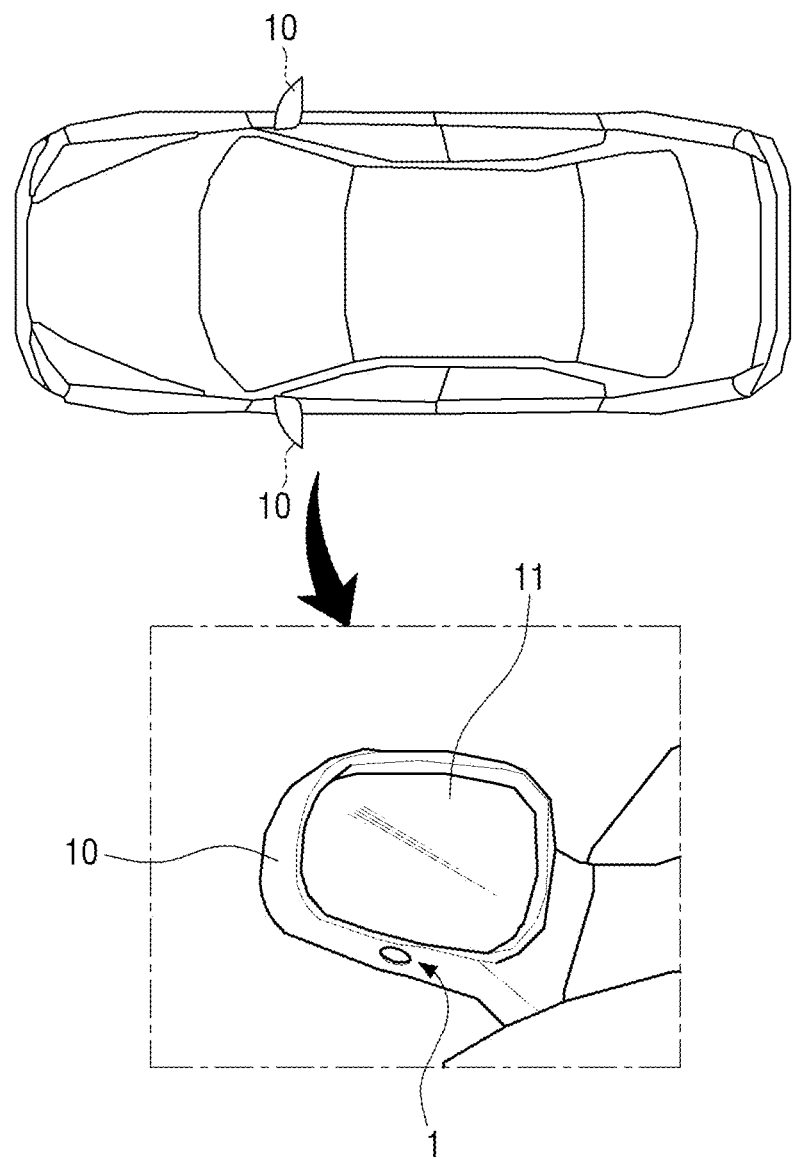
FIG. 1 is a schematic view showing a side mirror installed with a puddle lamp for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a puddle lamp for a vehicle according to embodiments of the present disclosure.

FIG. 1 is a schematic view showing a side mirror installed with a puddle lamp for a vehicle according to an embodiment of the present disclosure. Referring to FIG. 1, the puddle lamp 1 for a vehicle according to an embodiment of the present disclosure may be installed in or near a side mirror 10 on the driver's and/or front passenger's side of the vehicle to irradiate light to the ground around the vehicle or to the body of the vehicle, thereby securing the field of view when the driver and passengers embark and disembark in a dark environment.

Herein, referring to FIG. 1, an example in which a mirror 11 is used for securing a field of view is described, but the present disclosure is not limited thereto. Instead of the mirror 11, an imaging device (e.g., camera) capable of obtaining an image to secure a field of view that is required may be installed.

The vehicle puddle lamp 1 may not only secure a field of view for embarking and disembarking by irradiating light on the ground around the vehicle or on the vehicle body, but may also display an image such as a logo that can represent the unique personality of the vehicle when light is irradiated to the ground around the vehicle or on the vehicle body in order to improve the luxurious product image and marketability of the vehicle.

Figure 2:
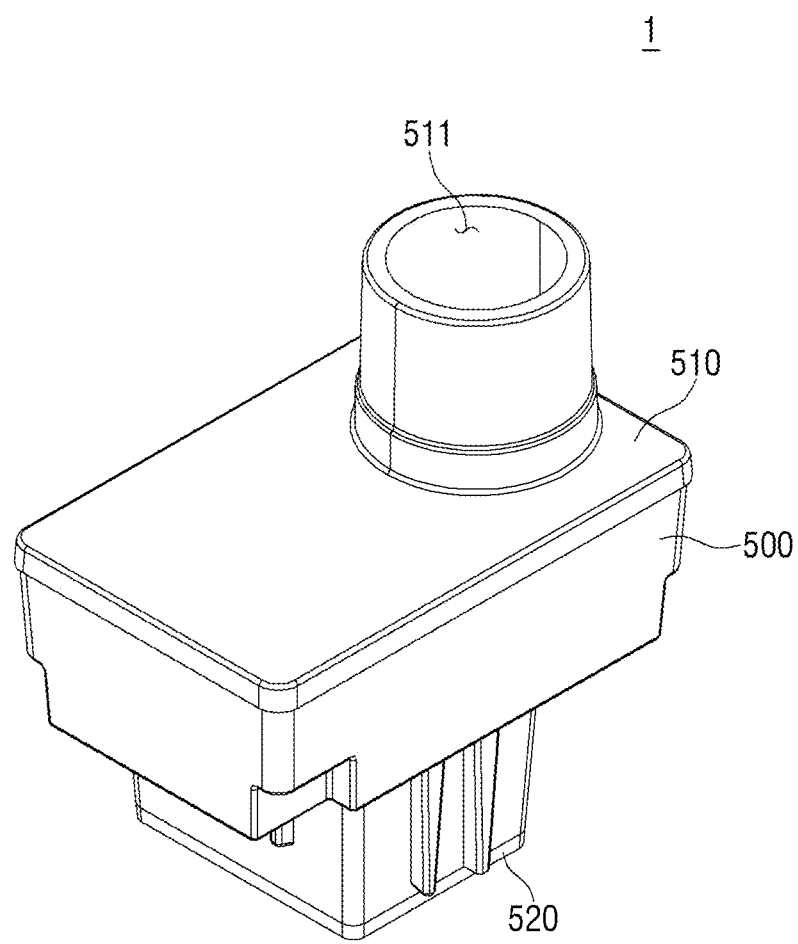
FIG. 2 is a perspective view showing an exterior of a puddle lamp for a vehicle according to an embodiment of the present disclosure.
Figure 3:
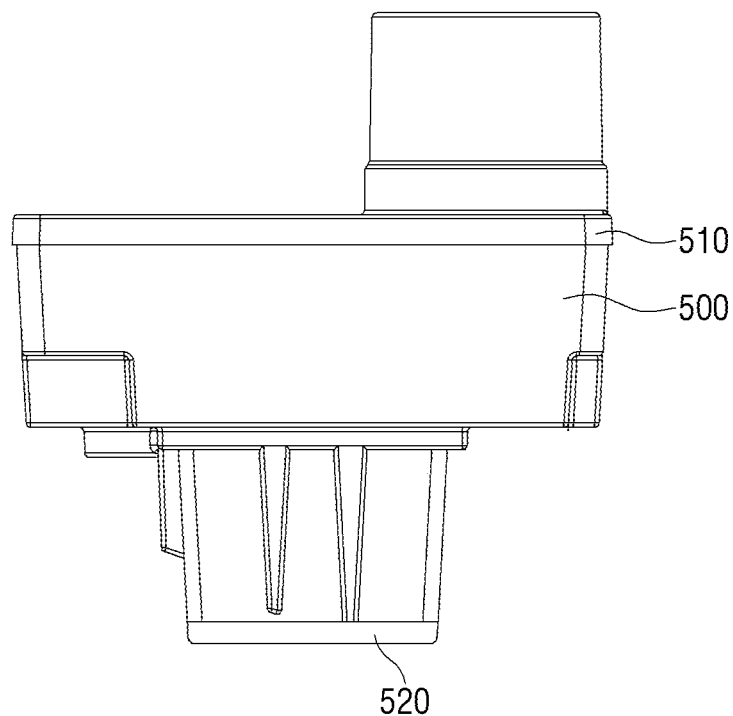
FIG. 3 is a side view showing the exterior of a puddle lamp for a vehicle according to an embodiment of the present disclosure.
Figure 4:
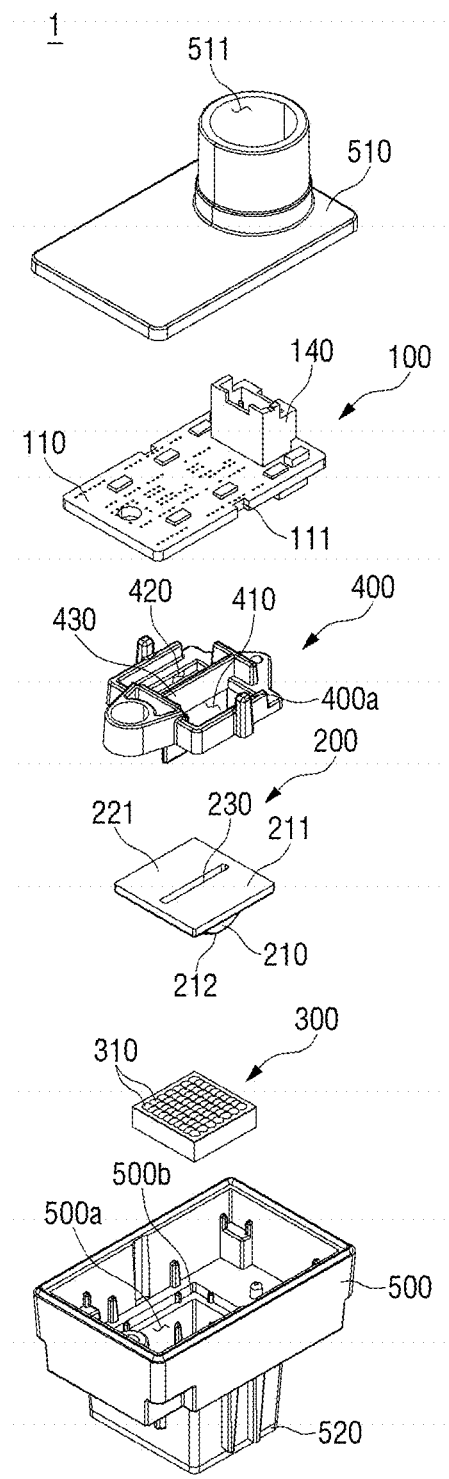
FIGS. 4 and 5 are exploded perspective views showing a puddle lamp for a vehicle according to an embodiment of the present disclosure.
Figure 5:
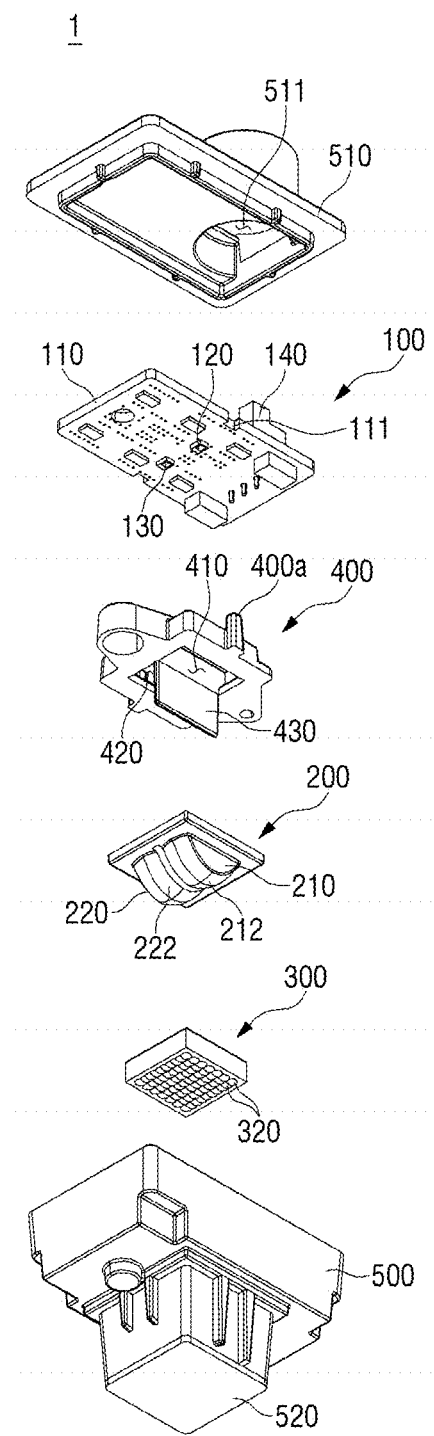
Figure 6:
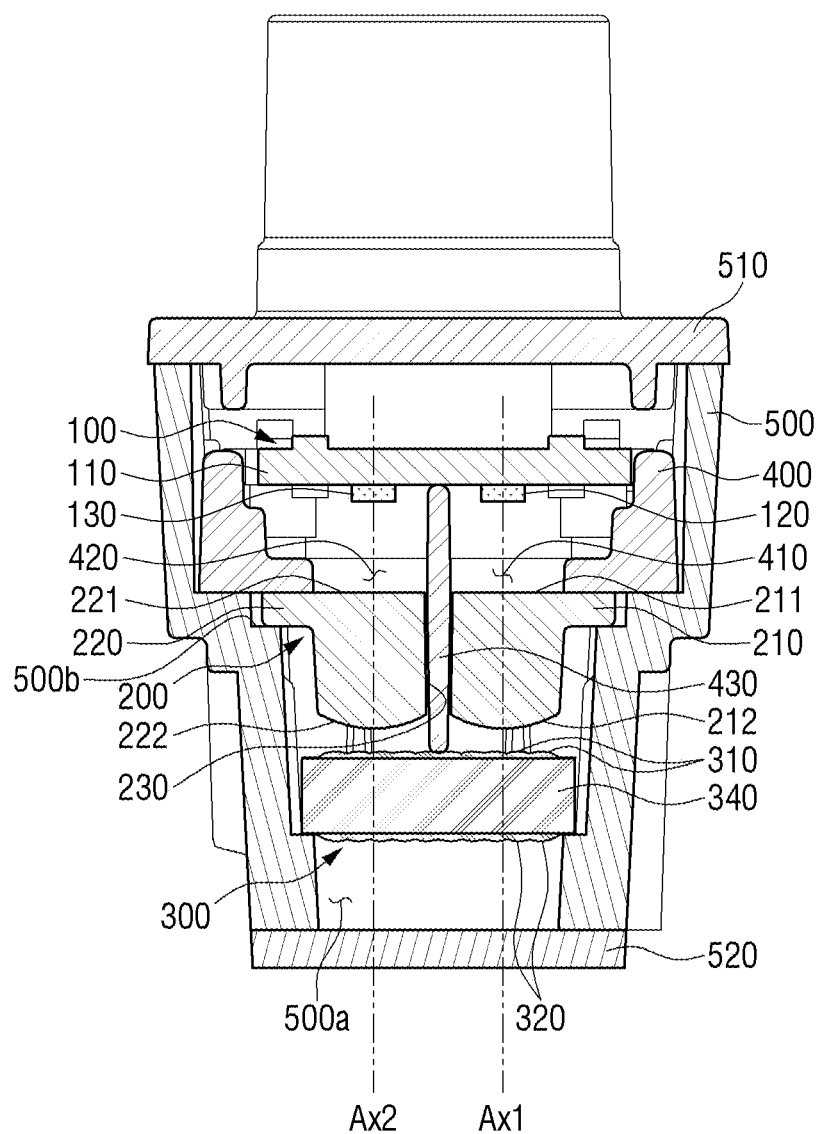
FIG. 6 is a cross-sectional view showing a puddle lamp for a vehicle according to an embodiment of the present disclosure.

FIG. 2 is a perspective view showing the exterior of the puddle lamp for a vehicle according to an embodiment of the present disclosure, FIG. 3 is a side view showing the exterior of the puddle lamp for a vehicle according to an embodiment of the present disclosure, FIGS. 4 and 5 are exploded perspective views showing a puddle lamp for a vehicle according to an embodiment of the present disclosure, and FIG. 6 is a cross-sectional view illustrating a puddle lamp for a vehicle according to an embodiment of the present disclosure.

Referring to FIGS. 2 to 6, the vehicle puddle lamp 1 according to an embodiment of the present disclosure may include a light source unit 100, a light condensing unit 200, an optical unit 300, and a holder 400, and at least some of these components may be accommodated within a housing 500.

The light source unit 100 may generate light having a light amount and/or color required for the vehicle puddle lamp 1 of the present disclosure. The light source unit 100 may include a substrate 110 and a plurality of light sources 120 and 130 installed on the substrate 110, and in an embodiment of the present disclosure, the reason that the light source unit 100 includes a plurality of light sources 120 and 130 is to form a plurality of images.

In the embodiment of the present disclosure, an example where the light source unit 100 includes two light sources 120 and 130 so that two images may be formed by the vehicle puddle lamp 1 will be described as an example. The two light sources 120 and 130 will be hereinafter referred to as a first light source 120 and a second light source 130, respectively. However, the number of light sources included in the light source unit 100 is not limited to the above-described example, and the number of light sources may be varied depending on the number of images to be formed by the vehicle puddle lamp 1 of the present disclosure.

Components such as a connector 140 for power supply or operation control of the plurality of light sources 120 and 130 may be installed on the substrate 110 as well as the plurality of light sources 120 and 130.

A cover 510 may be coupled to the housing 500 to accommodate the components within the housing 500. A connection aperture 511, through which a cable (not shown) connected to the connector 140 passes, may be formed in the cover 510 to enable control of the vehicle puddle ramp 1 of the present disclosure.

The light condensing unit 200 may condense the light generated from the light source unit 100. The light condensing unit 200 may be coupled to the holder 400. In the holder 400, a plurality of guide apertures 410 and 420, each corresponding to each of a plurality of light sources 120, may be formed so that the light generated from each of the plurality of light sources 120 and 130 may be guided to the light condensing unit 200, whereby the light generated from each of the plurality of light sources 120 and 130 may proceed to the light condensing unit 200 along the corresponding guide aperture among the plurality of the guide apertures.

In particular, the holder 400 may be disposed between the light source unit 100 and the light condensing unit 200 so that the positions of the light source unit 100 and the light condensing unit 200 may be fixed, and the light source unit 100 and the light condensing unit 200 may be coupled to opposites sides with respect to the holder 400. The fixed position of the light source unit 100 may be aligned by an alignment protrusion 400a formed in the holder 400 being inserted into an alignment groove 111 formed in the substrate 110.

The light condensing unit 200 may include a plurality of condensing lenses 210 and 220 corresponding to the plurality of light sources 120 and 130, respectively, and in the embodiment of the present disclosure, since a case with two light sources 120 and 130 is described as an example, two condensing lenses 210 and 220 may be included. In the following embodiment of the present disclosure, the plurality of condensing lenses 210 and 220 will be referred to as a first condensing lens 210 corresponding to the first light source 120 and a second condensing lens 220 corresponding to the second light source 130.

Incident surfaces 211 and 221 of each of the plurality of condensing lenses 210 and 220 may be integrally formed with each other, and the emitting surfaces 212 and 222 may be formed to be separated from each other. Thus, the plurality of condensing lenses 210 and 220 may be assembled collectively without assembling each separately, so that the assembly process can be simplified and the assemble property can be improved.

On the other hand, in the light condensing unit 200, a through hole 230, through which one end (e.g. a distal end) of a partition wall unit 430 that is formed in the holder 400 to partition the plurality of guide apertures 410 and 420 passes, may be formed. When the light condensing unit 200 is assembled to the holder 400, since one end of the partition wall unit 430 is located to pass through the through hole 230 disposed between the plurality of condensing lenses 210 and 220 and come into contact with an imaging unit 300 to be described later below, optical interference between the plurality of condensing lenses 210 and 220 may be prevented or reduced.

In addition, the other end (e.g., a proximal end) of the partition wall unit 430 may abut the substrate 110 so as to be disposed between the first light source 120 and the second light source 130, and thus, optical interference between the first light source 120 and the second light source 130 may be prevented or reduced.

In other words, the light respectively generated from the first light source 120 and the second light source 130 may be separated so as not to interfere with one another due to the partition wall unit 430 and may be guided to the first condensing lens 210 and the second condensing lens 220, respectively.

The imaging unit 300 may transmit the light condensed by the light condensing unit 200 to form an image having a predetermined shape on the ground around the vehicle. An opening 500a may be formed in the housing 500 so that the light that passes through the imaging unit 300 may be irradiated to the ground around the vehicle through an optical member 520 such as a lens provided in the opening 500a.

In other words, the imaging unit 300 may transmit the light generated from the first light source 120 and condensed by the first condensing lens 210 to form an image (hereinafter, referred to as a "first image") on the ground around the vehicle, and may also transmit the light generated from the second light source 130 and condensed by the second condensing lens 220 to form an image (hereinafter referred to as "second image") on the ground around the vehicle. Since the lights generated from the first light source 120 and the second light source 130 are separated from each other by the partition wall unit 430 until they are incident on the imaging unit 300 to be described later below, interference between the lights generated from the first light source 120 and the second light source may be prevented or reduced.

A step portion 500b may be formed at an end adjacent to the imaging unit 300 in the opening 500a, which is for more stable seating of the imaging unit 300, and therefore, movement of the imaging unit 300 may be prevented by the edge of the imaging unit 300 being seated on the step portion 500b.

Since the above-described imaging unit 300 can be shared between the first light source 120 and the second light source 130, the number of parts may be reduced and the configuration may be simplified. Therefore, when installing the vehicle puddle ramp 1 of the present disclosure in a narrow space such as the side mirror 10, it is possible to secure a sufficient installation space.

Figure 7:
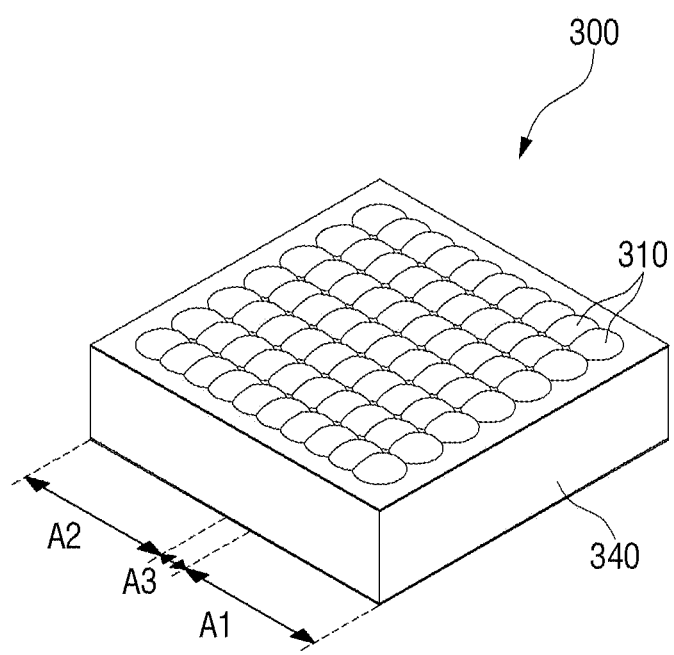
FIGS. 7 and 8 are perspective views showing an imaging unit according to an embodiment of the present disclosure.
Figure 8:
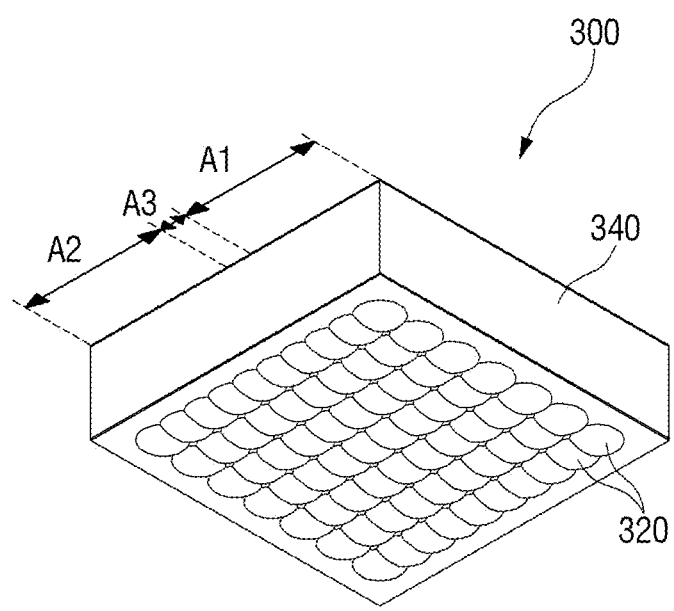
Figure 9:
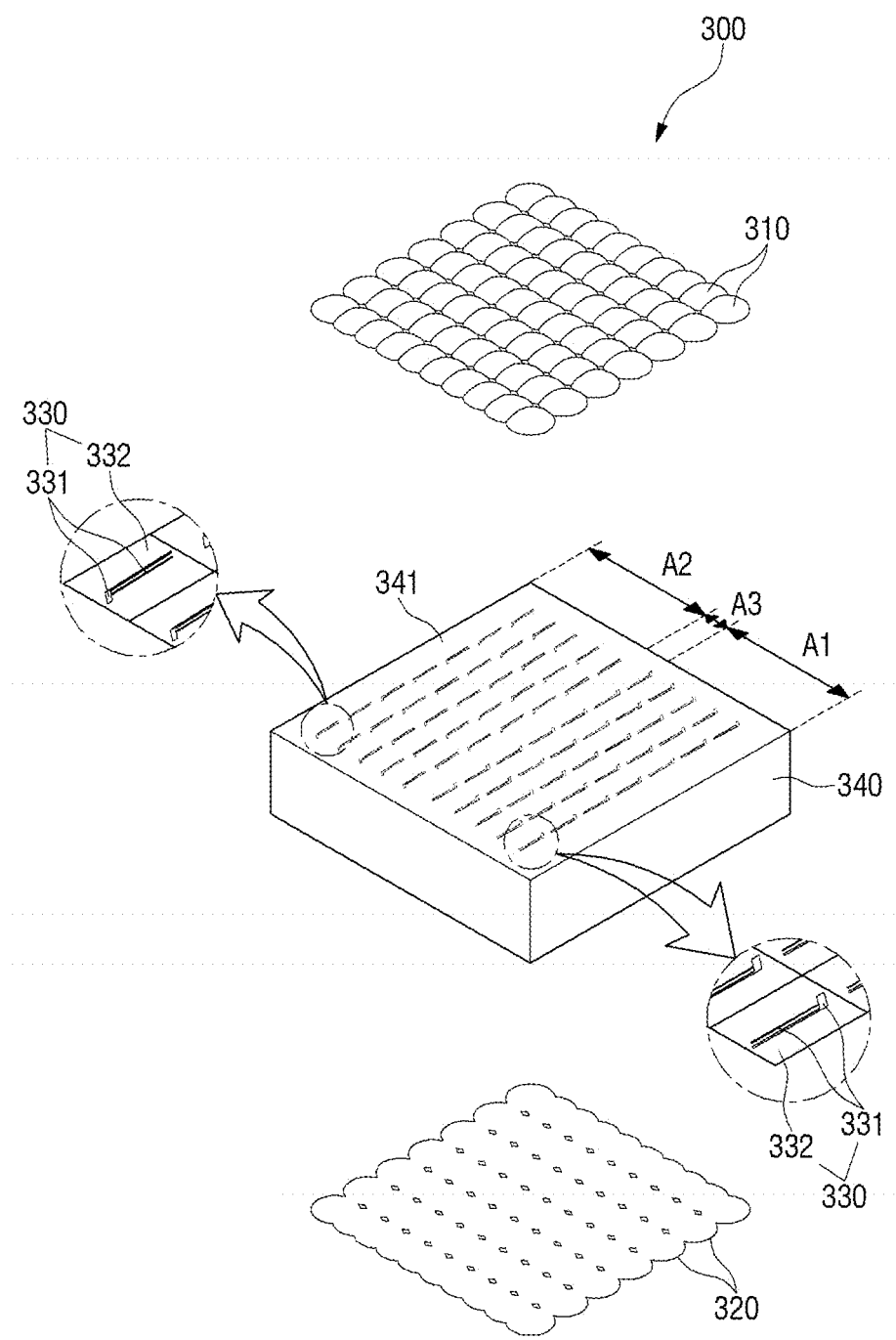
FIGS. 9 and 10 are exploded perspective views showing an imaging unit according to an embodiment of the present disclosure.
Figure 10:
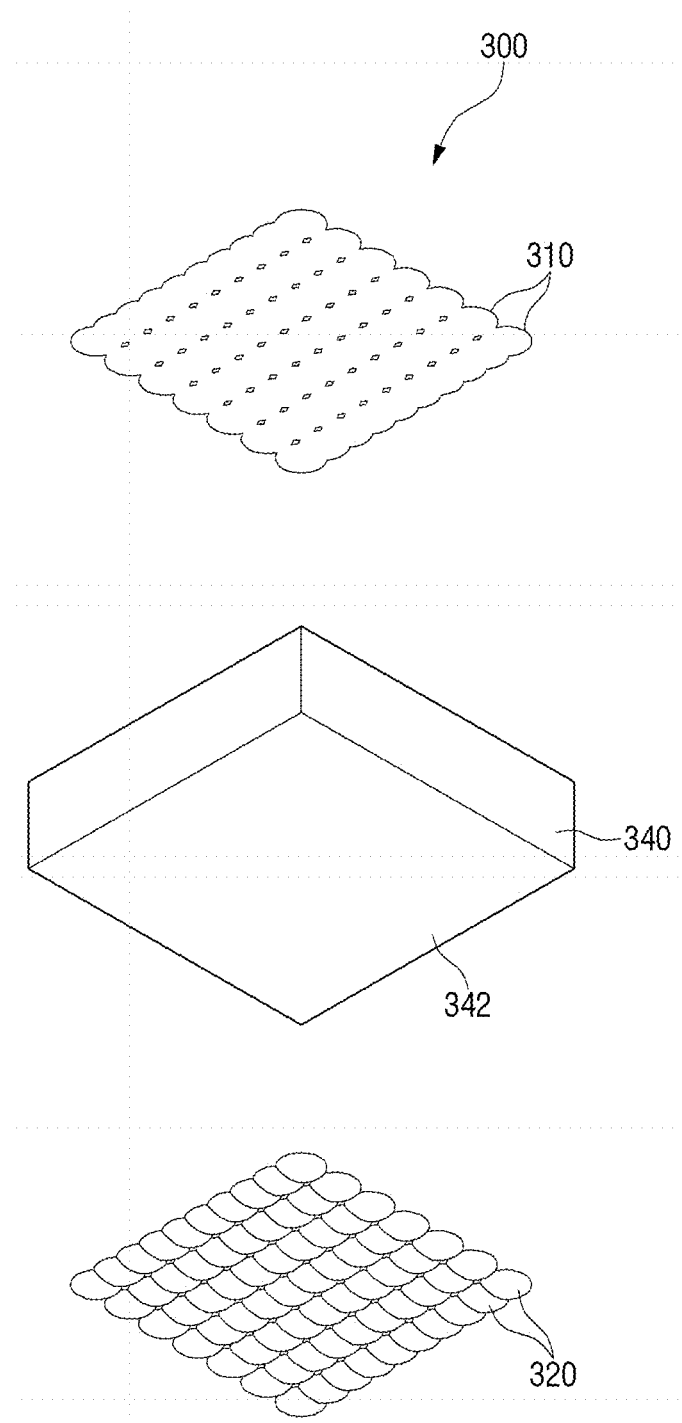

FIGS. 7 and 8 are perspective views illustrating an imaging unit according to an embodiment of the present disclosure, and FIGS. 9 and 10 are exploded perspective views showing an imaging unit according to an embodiment of the present disclosure. Referring to FIGS. 7 to 10, the imaging unit 300 may include a plurality of incident lenses 310, a plurality of emitting lenses 320, and a plurality of shields 330, and it can be understood that incident surfaces of the plurality of incident lenses 310 may collectively form an incident surface of the imaging unit 300, and emitting surfaces of the plurality of emitting lenses 320 may collectively form an emitting surface of the imaging unit 300.

In the embodiment of the present disclosure, the plurality of incident lenses 310 may be disposed on an incident surface 341 of an optical member 340, which is made of a material through which light passes, and the plurality of emitting lenses 320 may be disposed on an emitting surface 342 of the optical member 340.

In addition, the plurality of shields 330 may be formed on any one of the incident surface 341 or the emitting surface 342 of the optical member 340 to block at least a portion of the light proceeding to the corresponding emitting lens among the plurality of emitting lenses 320, and may serve to form an image having a shape required by the puddle lamp 1 for a vehicle of the present disclosure. Each of the plurality of shields 330 may include a transmission region 331 for transmitting light and a blocking region 332 for blocking or obstructing light, and depending on the shape of the transmission region 331, the shape of the image to be formed by the puddle lamp 1 for a vehicle of the present disclosure may be variously defined.

In particular, in the embodiment of the present disclosure, a case where the plurality of incident lenses 310 and the plurality of emitting lenses 320 correspond one-to-one is described as an example, but this is merely an example to help understanding of the present disclosure. The present disclosure is not limited thereto, and the plurality of incident lenses 310 and the plurality of emitting lenses 320 may correspond to each other in one-to-one, many-to-one, one-to-many, many-to-many, and the like. Examples the plurality of incident lenses 310 and the plurality of emitting lenses 320 corresponding many-to-one, one-to-many, and many-to-many are shown, e.g., in U.S. Pat. No. 10,458,614, which is incorporated herein by reference in its entirety.

The imaging unit 300 may include a plurality of regions A1 and A2, each corresponding to each of the plurality of light sources 120 and 130, and in the embodiment of the present disclosure, since the case where the light source unit 100 include two light sources 120 and 130 to form two images is described as an example, the imaging unit 300 may also include two regions A1 and A2. In the following embodiment of the present disclosure, the two regions A1 and A2 will be referred to as a first region A1 corresponding to the first light source 120 and a second region A2 corresponding to the second light source 130, respectively.

In the embodiment of the present disclosure, a case where the first image that is formed by the light generated from the first light source 120 and the second image that is formed by the light generated from the second light source 130 have different shapes will be described as an example. In such case, among the plurality of shields 330, the shield that belongs to the first region A1 and the shield that belongs to the second region A2 may have different shapes for the transmission region 331.

In addition, no shield may be formed in a region A3 corresponding to the distal end of the partition wall unit 430 in contact with the imaging unit 300, that is, in a region of the imaging unit 300 that faces the partition wall unit 430. Such configuration may prevent interference between images formed by passing through the first region A1 and the second region A2, respectively. Further, the distal end of the partition wall unit 430 may abut the incident surface of the imaging unit 300 so that pressure may be applied to the imaging unit 300 to fix the imaging unit 300 and to prevent movement thereof.

In the vehicle puddle lamp 1 of the present disclosure described above, at least a portion of an inner surface of the housing 500 may be subject to surface-treatment such as corrosion treatment, and it may be understood that the reflected light may be diffusely reflected so that the light that passes through the light condensing unit 200 or the light that passes through the imaging unit 300 may be reflected by the inner surface of the housing 500, preventing or reducing optical interference.

Figure 11:
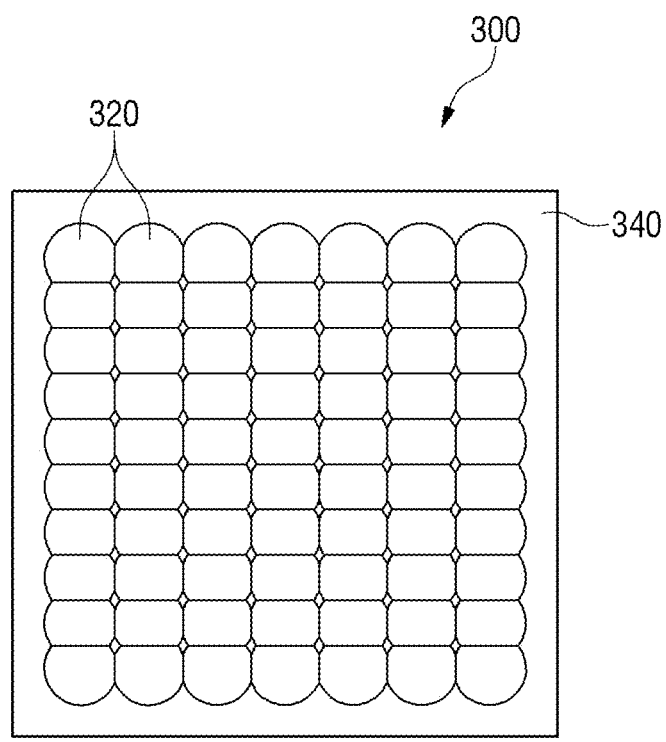
FIG. 11 is a plan view showing an imaging unit according to an embodiment of the present disclosure.

In addition, in the above-described embodiment, each of the plurality of incident lenses 310 and the plurality of emitting lenses 320 may have a substantially rectangular shape as shown in FIG. 11, and the light efficiency may be improved by reducing the space between adjacent incident lenses or adjacent emitting lenses. FIG. 11 is an example of the plurality of emitting lenses 320 having a rectangular shape, and similarly, the plurality of incident lenses 310 may also have a rectangular shape.

FIG. 12 is a schematic diagram illustrating an image formed by a puddle lamp for a vehicle according to an embodiment of the present disclosure. Referring to FIG. 12, in the puddle lamp 1 for a vehicle according to an embodiment of the present disclosure, a first image I1 may be formed by the light generated from the first light source 110, and a second image I2 may be formed by the light generated from the second light source 120. Any one of the first image I1 or the second image I2 may be formed according to on/off state of each of the first light source 110 and the second light source 120, and also, the first image I1 and the second image I2 may be formed concurrently. Accordingly, more diverse images may be formed.

On the other hand, in the above-described embodiments, a case, in which the plurality of light sources 120 and 130 are disposed on the optical axes Ax1 and Ax2 of the corresponding condensing lenses among the plurality of condensing lenses 210 and 220, was described as an example. However, the present disclosure is not limited thereto, and at least one of the plurality of light sources 120 and 130 may be disposed to be spaced apart so as to have a predetermined offset with respect to the optical axis of the corresponding condensing lens among the plurality of condensing lenses 210 and 220. The reason that at least one of the plurality of light sources 120 and 130 is spaced apart by the predetermined offset is because the vehicle puddle lamp 1 may be configured to irradiate light along a direction inclined by a predetermined angle with respect to the vertical direction as well as along a direction parallel therewith. In such case, both sides with respect to the point where the optical axis of the condensing lens and the ground meet may be formed to have different sizes, and the sharpness of at least a portion of the image may be deteriorated due to the inclined irradiation.

Figure 13:
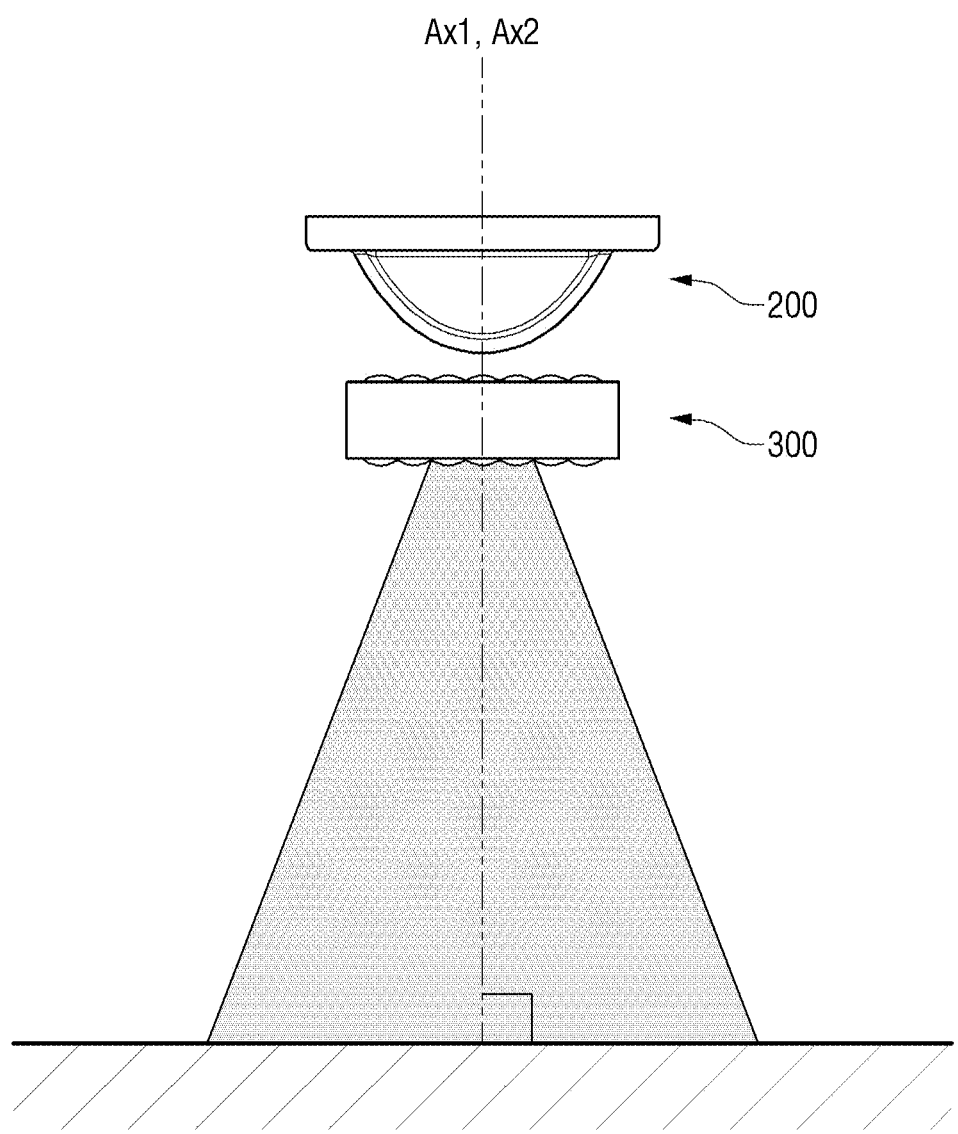
FIGS. 13 and 14 are schematic views showing a light irradiation range according to a mounting angle of a puddle lamp for a vehicle according to an embodiment of the present disclosure.
Figure 14:
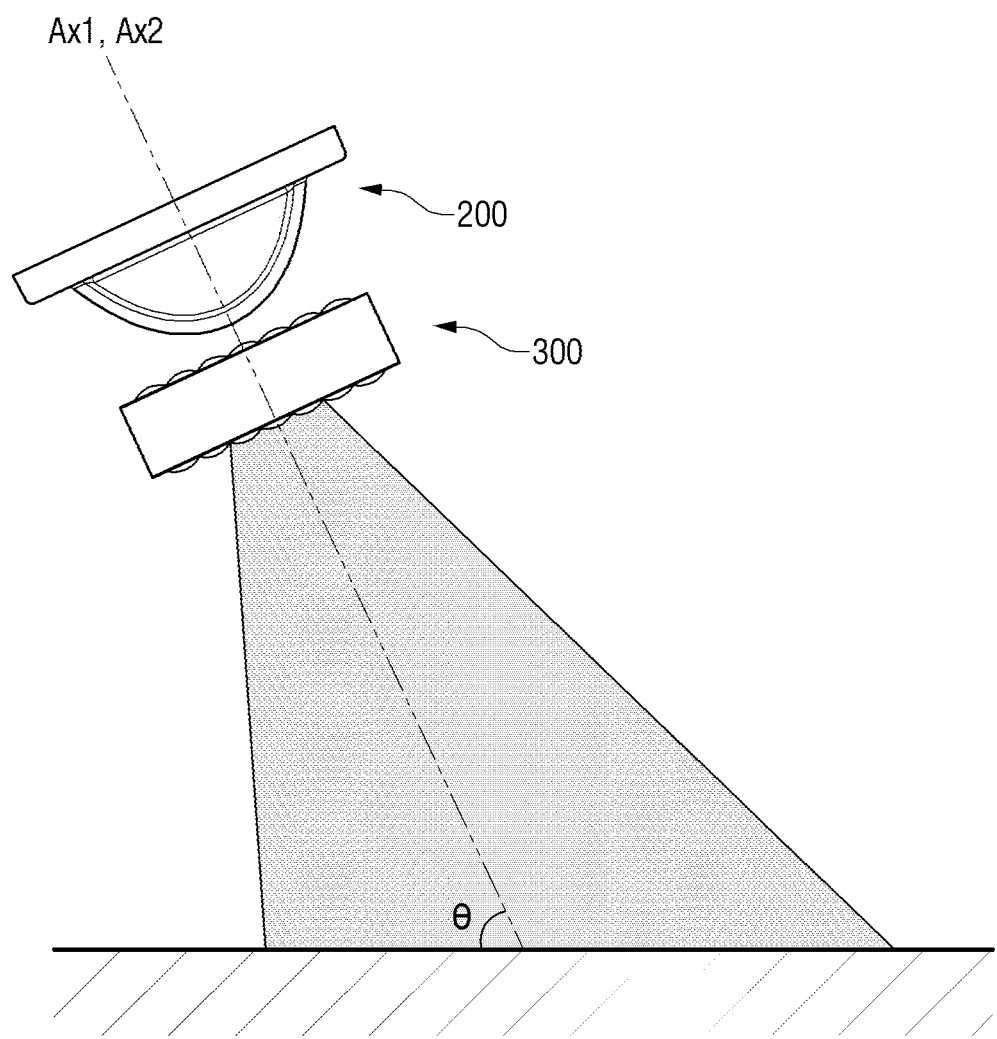

FIGS. 13 and 14 are schematic views showing a light irradiation range according to a mounting angle of a puddle lamp for a vehicle according to an embodiment of the present disclosure. Referring to FIG. 13, the optical axes Ax1 and Ax2 of each of the first and second condensing lenses 210 and 220 may be formed perpendicular to the ground, and in this case, since the areas of both sides of the light irradiated are approximately the same with respect to the respective optical axes Ax1 and Ax2 of the first and second condensing lenses 220 and 210, each of the first light source 110 and the second light source 120 may be disposed on the respective optical axes Ax1 and Ax2 of the first and second condensing lenses 210 and 220.

Referring to FIG. 14, however, the respective optical axes Ax1 and Ax2 of the first and second condensing lenses 210 and 220 may be inclined by a predetermined angle θ with respect to the vertical direction. In this case, since the areas of both sides of the light irradiated are different with respect to the respective optical axes Ax1 and Ax2 of the first and second condensing lenses 210 and 220, the sharpness of the image may be deteriorated.

For example, in case the respective optical axes Ax1 and Ax2 of the first and second condensing lenses 210 and 220 are inclined by a predetermined angle toward the rear side of the vehicle in order to prevent the vehicle puddle lamp 1 of the present disclosure from interfering with the vehicle body and to improve the visibility, the area irradiated with light is relatively larger toward the rear than the front with respect to the respective optical axes Ax1 and Ax2 of the first and second condensing lenses 210 and 220, and also the area irradiated with the light is relatively larger on the outer side than the inner side of the vehicle. Therefore, to minimize a possibility that the sharpness of the image is deteriorated, at least one of the plurality of light sources 120 or 130 may be spaced apart by the predetermined offset in at least one direction with respect to the optical axis of the corresponding condenser lens among the plurality of condensing lenses 210 and 220.

Figure 15:
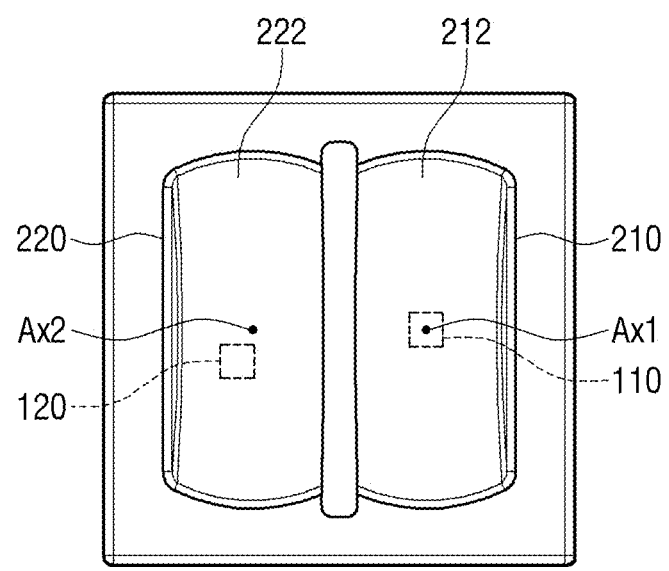
FIG. 15 is a schematic diagram illustrating a light source located to be spaced apart with respect to an optical axis of a condensing lens according to a mounting angle of a puddle lamp for a vehicle according to an embodiment of the present disclosure.

In this way, as shown in FIG. 15, at least one of the first light source 110 or the second light source 120 may be spaced apart by an offset amount in at least one direction with respect to the optical axis of the corresponding condensing lens among the first condensing lens 210 and the second condensing lens 220 in order to prevent the sharpness of the image from being deteriorated despite the inclined mounting angle of the vehicle puddle lamp 1 of the present disclosure.

FIG. 15 depicts an example, in which the first light source 110 is spaced apart with respect to the optical axis Ax1 of the first condensing lens 210, and the second light source 120 is disposed on the optical axis Ax2 of the second condensing lens 220. However, the present disclosure is not limited thereto, and depending on the mounting angle of the vehicle puddle lamp 1 of the present disclosure or the sharpness of the image to be formed by the vehicle puddle lamp 1 of the present disclosure, at least one of the first light source 110 or the second light source 120 may be offset by a predetermined distance in at least one direction with respect to the optical axis of the corresponding condensing lens among the first and second condensing lenses 210 and 220.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A puddle lamp for a vehicle comprising:
   a light source unit including a plurality of light sources installed on a substrate to allow formation of a plurality of images on a ground;
   a light condensing unit including a plurality of condensing lenses for condensing light generated from the plurality of light sources;
   an imaging unit for transmitting the light from the light condensing unit to form at least one of the plurality of images; and
   a holder disposed between the light source unit and the light condensing unit to fix positions of the light source unit and the light condensing unit, wherein the holder comprises a partition wall unit to allow the light generated from each of the plurality of light sources to be separated from one another and to proceed to the imaging unit.

2. The puddle lamp of claim 1, wherein the plurality of condensing lenses have an incident surface integrally formed therewith.

3. The puddle lamp of claim 1, wherein the holder comprises a plurality of guide apertures for guiding the light generated from each of the plurality of light sources to each of the plurality of condensing lenses, and
   wherein the plurality of guide apertures are partitioned by the partition wall unit.

4. The puddle lamp of claim 1, wherein the partition wall unit comprises a distal end that passes through a through hole formed in the light condensing unit to be in contact with the imaging unit, and a proximal end disposed between the plurality of light sources to be in contact with the substrate.

5. The puddle lamp of claim 4, wherein the through hole is disposed between the plurality of condensing lenses.

6. The puddle lamp of claim 1, wherein the imaging unit comprises:
   a plurality of incident lenses;
   a plurality of emitting lenses corresponding to the plurality of incident lenses; and
   a plurality of shields for obstructing at least a portion of light from proceeding to the plurality of emitting lenses.

7. The puddle lamp of claim 6, wherein each of the plurality of shields comprises:
   a transmission region through which light is transmitted; and
   a blocking region that obstructs light,
   wherein a shape of the image is defined by a shape of the transmission region.

8. The puddle lamp of claim 7, wherein the imaging unit comprises a plurality of regions, each corresponding to each of the plurality of light sources, and
   wherein a shield belonging to at least one of the plurality of regions among the plurality of shields has the transmission region having a different shape from a shield belonging to at least one other of the plurality of regions among the plurality of shields.

9. The puddle lamp of claim 6, wherein no shield is formed in a region that faces the partition wall unit.

10. The puddle lamp of claim 6, wherein the imaging unit further comprises an optical member, in which the plurality of incident lenses are disposed on an incident surface thereof and the plurality of emitting lenses are disposed on an emitting surface thereof, and
    wherein the plurality of shields are formed on one of the incident surface or the emitting surface of the optical member.

11. The puddle lamp of claim 1, further comprising:
    a housing, which accommodates the light source unit, the light condensing unit, the imaging unit, and the holder therein,
    wherein at least a portion of an inner surface of the housing is surface-treated to allow light to be diffusely reflected.

12. The puddle lamp of claim 11, wherein the housing includes an opening, through which the light that passes through the imaging unit is irradiated, and wherein, at an end of the opening proximate to the imaging unit, a step portion is formed to allow an edge of the imaging unit to be seated.

13. The puddle lamp of claim 1, wherein at least one of the plurality of light sources is spaced apart by a predetermined offset in at least one direction with respect to an optical axis of a corresponding condensing lens of the plurality of condensing lenses.

* * * * *